May 23, 1933. F. W. GUEST 1,911,149
LOCK
Filed Jan. 12, 1932
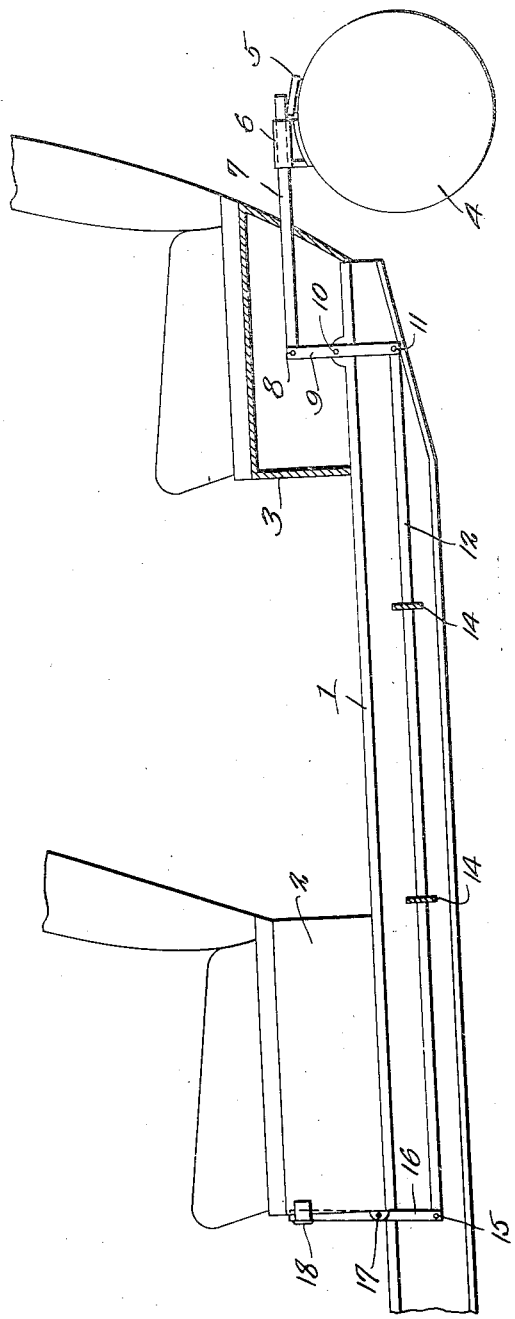
Inventor
F. W. Guest
By C. A. Snow & Co.
Attorneys Patented May 23, 1933

1,911,149

UNITED STATES PATENT OFFICE

FRANK W. GUEST, OF BREMERTON, WASHINGTON, ASSIGNOR OF FIFTY PER CENT TO J. L. THOMAS, OF SEATTLE, WASHINGTON

LOCK

Application filed January 12, 1932. Serial No. 586,209.

This invention aims to provide novel means whereby the fuel tank of an automobile may be locked, to prevent the theft of fuel, novel means being provided for operating and controlling the bolt which cooperates with the cap of the tank, the construction being such that no alterations need be made in the cap, to adapt it for cooperation with the bolt.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:—

Fig. 1 is an elevation, showing in diagram, a part of an automobile on which the device forming the subject matter of this application has been mounted.

In Fig. 1 there is shown, diagrammatically, a portion of the frame 1 of an automobile, the base of the front seat being designated by the numeral 2, and the numeral 3 marking the base of the rear seat. The fuel tank, at the rear end of the car, is designated by the numeral 4, and carries a closure, generally a removable filling cap 5, held in place on the tank by threading or otherwise.

A guide 6 is mounted on the top of the fuel tank 4, and extends lengthwise of the car. In the guide 6, a locking bolt 7 is mounted for right line reciprocation, the locking bolt, at its rear end, overhanging the filling cap 5, so that the filling cap cannot be removed, unless the locking bolt is advanced from the position shown in Fig. 1.

The locking bolt 7 extends forwardly, into the base 3 of the rear seat, and has its forward end pivotally connected at 8 with a rear lever 9, fulcrumed intermediate its ends, as shown at 10, upon any accessible portion of the car.

At its lower end, the lever 9 is pivoted at 11 to the rear end of a connection 12, preferably a rigid rod or bar, mounted for longitudinal reciprocation in guides 14, carried by the frame 1 of the car. The forward end of the connection 12 is pivoted at 15 to the lower end of a forward lever 16, extended upwardly through the floor of the car (not shown). The lever 16 is fulcrumed intermediate its ends, as shown at 17, on the front wall of the base 2 of the front seat, or on any other convenient portion of the car. The upper end of the lever 16 is held, releasably, by engagement with a lock 18, on the front wall of the base 2 of the front seat.

In practical operation, a person occupying the front seat can release the lock 18, thereby setting the lever 16 free. The upper end of the lever 16 is swung forwardly, the connection 12 is carried rearwardly, the upper end of the lever 9 is carried forwardly, and the locking bolt 7 is slid forwardly, thereby setting the filling cap 5 free. A reversal of the operation alluded to of course restores the parts to the position of Fig. 1. When the lock 18 is engaged with the upper end of the lever 16, the bolt 7 is above the filling cap 5, the filling cap cannot be removed, and a pilfering of fuel is impossible.

Although the operator of the car can lock the filling cap 5 against removal, he does not have to leave the car, or get out of the front seat, in order to lock the filling cap 5 or set the filling cap free, it being necessary, merely, for the driver of the car to reach down, unlock the lock 18, and swing the lever 16 on its fulcrum 17. This is convenient at all times, but especially in bad weather, when the operator does not wish to leave the car.

Having thus described the invention what is claimed is:—

In a vehicle having a front seat provided with a base, a rear seat provided with a base, a fuel tank behind the rear seat, and a movable closure for the fuel tank: a forward lever fulcrumed intermediate its ends on the car and accessible for direct manipulation from a point immediately adjacent to the front wall of the base of the front seat, means for locking the upper end of the forward lever to the front-wall of the base of the front seat, a rigid connection extended backwardly below the bases of both seats, means for pivoting the forward end of the connection to the lower end of the forward lever, a rear lever fulcrumed intermediate its ends on the car and having its upper end housed in the base of the rear seat, means for pivoting the rear end of the connection to the lower end of the rear lever, a locking bolt engaging the closure and extended forwardly from a point without the base of the rear seat into the base of the rear seat, and means for pivoting the forward end of the locking bolt to the upper end of the rear lever.

In testimony that I claim the foregoing as my own, I have hereto affixed my signature.

FRANK W. GUEST.